United States Patent [19]
Green

[11] Patent Number: 5,357,962
[45] Date of Patent: Oct. 25, 1994

[54] ULTRASONIC IMAGING SYSTEM AND METHOD WTIH FOCUSING CORRECTION

[75] Inventor: Philip S. Green, Redwood City, Calif.

[73] Assignee: SRI International, Menlo Park, Calif.

[21] Appl. No.: 826,507

[22] Filed: Jan. 27, 1992

[51] Int. Cl.$^5$ .................... A61B 8/00; G01N 29/00
[52] U.S. Cl. ................... 128/660.07; 73/626
[58] Field of Search ............ 128/660.05, 660.06, 128/661.09; 73/625–626

[56] References Cited

U.S. PATENT DOCUMENTS

| | | | |
|---|---|---|---|
| 4,852,577 | 8/1989 | Smith et al. | 128/660.07 |
| 4,989,143 | 1/1991 | O'Donnell et al. | 364/413.25 |
| 5,170,170 | 12/1992 | Soumekh | 128/660.07 X |

OTHER PUBLICATIONS

"Adaptive Ultrasonic Array Imaging System Through an Inhomogeneous Layer," Hirama et al. J. Acoust. Soc. Am. 71(1), Jan. 1982, pp. 100–109.
"Imaging Through an Inhomogeneous Layer by Least-mean-square Error Fitting," Hirama et al, J. Acoust. Soc. Am. 75(4), Apr. 1984, pp. 1142–1147.
"Phase Aberration Correction in Medical Ultrasound Using Speckle Brightness as a Quality Factor," Nock et al, J. Acoust. Soc. Am. 85(5), May 1989, pp. 1819–1833.
"Experimental Results with a Real-Time Ultrasonic Imaging System for Viewing Through Distorting Media," Trahey et al, IEEE Trans. on Ultrasonics, Ferroelectrics, and Frequency Control, vol. UFFC-37, No. 5, Sep. 1990, pp. 418–427.
Third Annual IEEE Symposium on Computer-Based Medical Systems 3 Jun. 1990, North Carolina, USA pp. 38–43, XP167292 D. Zhao et al. 'Two Algorithms for Correcting Phase Aberration in a Computer-Controlled Ultrasonic Imaging System'.

Primary Examiner—Francis Jaworski
Attorney, Agent, or Firm—Victor R. Beckman

[57] ABSTRACT

Ultrasonic imaging apparatus and method are shown which include electronic correction of focus defects produced by acoustic refractive index inhomogeneities within an object (14) being imaged. The region of interest (38) within which focus correction takes place is selected by the operator using control (42 or 84). The imaging system includes adjustable time delays (28-1 through 28-c) through which return signals from transducers (10-1 through 10-n) pass. Outputs from the delays are summed (30) and the resultant signal is envelope detected (32). The envelope detector output is prepared for display at display (36) by scan converter (34). The output from a focus correction delay control circuit (64) is used to control delay times of individual delays (28-1 through 28-c) to provide for a delay profile across operative elements of transducer array (10), which delay profile includes delay profile components that correspond to low order terms of a series expansion, such as a Fourier series (FIG. 4). The adjustable signal delays (28-1 through 28-c) are simultaneously adjusted by the focus correction delay control (64) during selection of delay profile component amplitudes which reduce focus defects within the region of interest 38. Either manual (FIG. 1) or automatic (FIG. 5) focus correction is provided.

13 Claims, 6 Drawing Sheets

ULTRASONIC IMAGING SYSTEM AND METHOD WTIH FOCUSING CORRECTION

FIELD OF THE INVENTION

This invention relates generally to ultrasonic imaging method and means with focusing correction for inhomogeneous media.

BACKGROUND OF THE INVENTION

Ultrasonic images made in a media that is inhomogeneous in the acoustic refractive index, i.e. in its speed of sound, generally exhibit focusing errors. For imaging systems utilizing multi-element transducer arrays and adjustable time delay means connected to operative elements of the array for focusing and beam steering, it is possible to correct such focus errors to some degree by imposing adjustments to the time delays.

One prior art method for accomplishing reduction of focus defects includes cross correlating short segments of the signals received by adjacent or nearby array elements, corresponding to a point in the object space for which the correction is to be made. The cross-correlation coefficient should be maximum at a time shift equal to the beam steering and focusing delay required to image at that point. If it differs, a time shift correction is introduced to bring it into conformity. All time-shifted corrected waves are summed. Cross-correlation methods for correcting for distorting medium are shown in U.S. Pat. No. 4,484,477 by Buxton, U.S. Pat. No. 4,471,785 by Wilson et.al., U.S. Pat. No. 4,817,614 by Hassler et al and in an article "Phase aberration Correction Using Signals from Point Reflectors and Diffuse Scatterers: Basic Principles" Flax et.al., IEEE Trans. on Ultrasonics, Ferroelectrics, and Frequency Control, vol. UFFC 37, No. 5, September 1990, pp. 758–767.

Another prior art method for at least partially correcting for focus errors produced by inhomogeneities in the media includes arbitrarily time shifting signals from each element or small group of elements and testing to see if the effect was to increase or decrease the quality of the detected summed signal corresponding to the region in the object space in which focus is to be improved. Each element or small group of elements is corrected in turn until the process converges. Quality of detected summed signal in the region of interest (ROI) may be determined by measuring the "speckle" amplitude, i.e. the mean of the Rayleigh-distributed magnitude, within the region of interest. Examples of such methods are shown in the following articles: "Phase Aberration Correction in Medical Ultrasound Using Speckle Brightness as a Quality Factor," Nock et al, J.Acoust. Soc. Am. 85(5), May 1989, pp. 1819–1833 and "Experimental Results With a Real-Time Ultrasonic Imaging System for Viewing Through Distorting Media," Trahey et al, IEEE Trans. on Ultrasonics, Ferroelectrics, and Frequency Control, Vol. UFFC-37, No. 5, September 1990, pp. 418–427.

A typical ultrasonic imaging apparatus may include 64 or 128 transducer elements and associated adjustable signal delay means. Where delays are adjusted individually, or in small groups, when correcting for focus defects produced by velocity inhomogeneity of the object under examination, as in the prior art, a relatively large amount of time is required to make the corrections. Whenever the region of interest changes, or the transducer array is moved relative to the object, the time-consuming correction process must be repeated.

SUMMARY AND OBJECTS OF THE INVENTION

An object of this invention is the provision of an improved ultrasonic imaging method and apparatus which includes means for rapidly reducing or correcting for focusing defects produced by acoustic refractive index inhomogeneities within a region of interest within a section being imaged.

An object of this invention is the provision of an improved ultrasonic imaging method and apparatus of the above-mentioned type wherein reducing or correcting for focusing defects may be automatically performed.

An object of this invention is the provision of an improved ultrasonic imaging method and apparatus of the above-mentioned type which includes manual correction control.

In accordance with the present invention a section within an inhomogeneous object is insonified using a transducer array which includes an array of transducer elements such as a linear, annular, two-dimensional array, or the like. Ultrasonic waves received by the transducer array are converted to electrical signals which are supplied to an array of adjustable signal delay means for electronic focusing, steering and/or stepping as required, and for correction of focus defects produced by acoustic refractive index inhomogeneities within a region of interest within the section. Outputs from the signal delay means are summed, and the resultant signal is envelope detected. Scan converter means converts the envelope detected signal for display at visual display means. The adjustable signal delay means are controlled to provide for a composite delay profile across operative elements of the transducer array, which composite delay profile comprises delay profile components corresponding to low order terms of a series expansion, such as a Fourier or power series. The amplitudes of individual delay profile components are controlled by control of the adjustable signal delay means for selection of delay profile component amplitudes that reduce focus defects within a selected region of interest within the section being imaged. Adjustable signal delay means for operative transducer elements are substantially simultaneously adjusted when controlling the amplitude of individual delay profile components. With a change in delay profile component amplitude, the image quality within the region of interest is observed, and the amplitude which results in the best quality is selected for use. Quality of image within the region of interest may be determined automatically or by observation by the operator. For automatic operation the mean speckle amplitude, or brightness, of the image within the region of interest may be determined to provide a measure of quality. When the amplitude of the individual delay profile components have been adjusted for maximum reduction of focus defects the resultant composite delay correction profile is employed during imaging operation. When a different region of interest is selected, the above-described process of establishing a delay correction profile for the selected region of interest is repeated.

The invention, together with other objects, advantages and features will be more fully understood from a consideration of the following detailed description of certain embodiments thereof taken in connection with the accompanying drawings. It here will be understood that the drawings are for purposes of illustration only, the invention not being limited to the specific embodiments disclosed therein.

BRIEF DESCRIPTION OF THE DRAWINGS

In the drawings, wherein like reference characters refer to the same parts in the several views.

The present invention is based upon the observation that some patterns of focusing errors are more likely than others. In particular, if a desired ensemble of phase shifts for focusing correction were to be decomposed into an infinite series, such as a Fourier series, the majority of the correction would be contained in the lower order, i.e. the low spatial frequency, terms. It was recognized, therefore, that it is possible to produce a high degree of correction by adjusting only a few coefficients of the expansion terms. In accordance with the present invention, delays are adjusted simultaneously during adjustment of the low spatial frequency terms which avoids having to adjust all of the delays independently, or in small groups, as in prior art arrangements.

Figure 1:
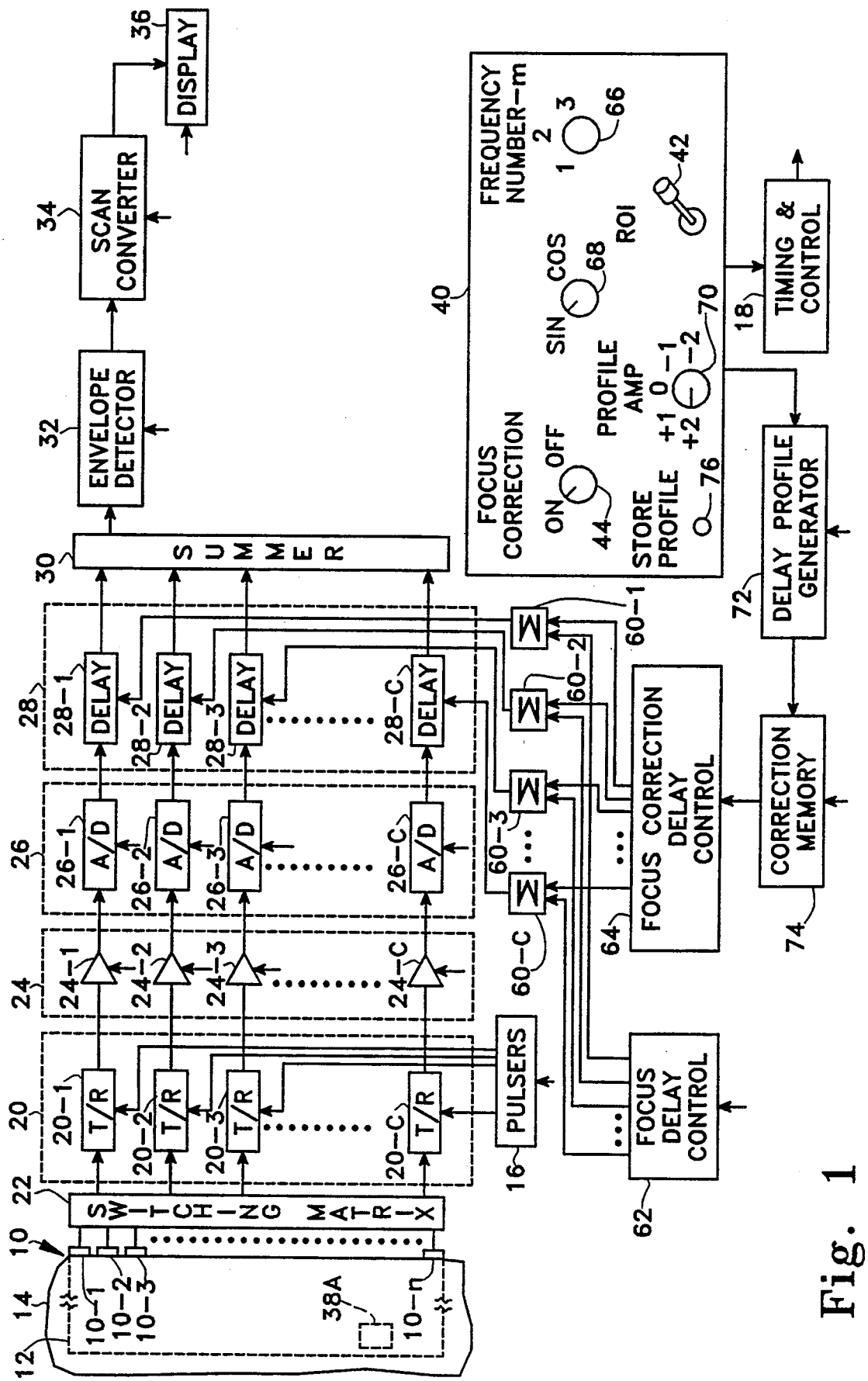
FIG. 1 is a block diagram showing an ultrasonic imaging system with manual focusing correction embodying the present invention.

Reference now is made to FIG. 1 wherein there is shown one embodiment of this invention comprising a linear transducer array 10 which includes transducer elements 10-$l$ through 10-$n$ where, in practice, n often equals 64 or 128. Preferably, the array is provided with a cylindrical lens focusing means, not shown, for beam focusing in a plane normal to the plane of the section 12 within the object 14 to be imaged. With the illustrated arrangement, the section 12 lies in the longitudinal plane of the transducer array 10 for B-scan imaging. As will become apparent, the focus correcting system is not limited to use with the illustrated B-scan imaging system. For example, focusing correction in a C-scan imaging system also is possible.

Transducer array 10 is included in a pulsed ultrasonic B-scan imaging system which also includes a transmitter comprising pulsers 16 which are supplied with recurrent timing pulses from a timing and control unit 18 for on-off control thereof. With a pulser turned on, a high frequency ultrasonic energy pulse is generated which is connected through transmit-receive switch unit 20, comprising T/R switches 20-$l$ through 20-$c$, to switching matrix 22 and thence to a selected transducer element. Timing and control signals from unit 18 are supplied to the switching matrix for selecting a group of transducer elements to be activated during pulse transmitting and receiving operation. Focusing of the transmitted beam is provided by timing of the operation of pulsers 16. The axis of the transmitted beam is shifted along the transducer array dependent upon the set of adjacent transducer elements employed during the transmitting operation which, in turn, is dependent upon the operation of switching matrix 22.

Reflected ultrasonic waves from discontinuities within the pulse-insonified object 14 received by the transducer array are converted to equivalent electrical signals by individual transducer elements thereof. Received signals pass through switching matrix 22 and transmit-receive switches 20 to an amplifier array 24 which includes amplifiers 24-$l$ through 24-$c$. Signals from the amplifiers are converted to digital form by analog to digital converters 26-$l$ through 26-$c$ included in A/D converter array 26. The A/D converter outputs are connected to an array 28 of digital delay means 28-$l$ through 28-$c$, which delay means may be implemented as dual port addressable memories of a type illustrated in U.S. Pat. No. 4,484,477. As described in detail hereinbelow, delay means 28-$l$ through 28-$c$ are employed during the receiving operation for both focusing of the transducer array and for correcting for focus defects due to inhomogeneities in object 14. If sector scanning is employed, delay array 28 could also be employed to provide for such sector scanning.

Figure 2:
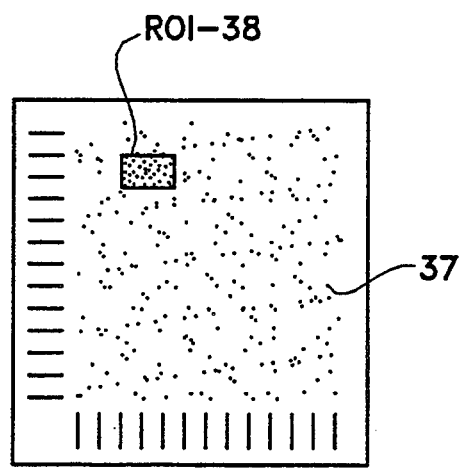
FIG. 2 shows a display with a region of interest (ROI) within which focusing defects are reduced by use of the present invention.

Outputs from the delay means 28-$l$ through 28-$c$ are supplied to a summing circuit 30, and the summing circuit output is connected to an envelope detector 32. The envelope detector may be implemented by a full wave rectifier operation followed by low pass filtering. The output from envelope detector 32 is connected to a scan converter 34, and the scan converter output is, in turn, connected to display unit 36 for visual display of an ultrasonic image. In FIG. 2, an example of a display 37 provided by the imaging system is shown which may include tick marks along sides thereof for use in distance measurements. When focus correction is turned on, an operator-selected region of interest (ROI) 38 also is displayed as shown in FIG. 2, within which region focus correction is to be provided. In FIG. 1, the selected region of interest 38A within section 12 to be imaged is shown. A control panel 40 is shown in FIG. 1 which includes ROI control means 42 for selecting the region of interest within the display and the size thereof when focus correction control switch 44 is turned on.

Figure 3:
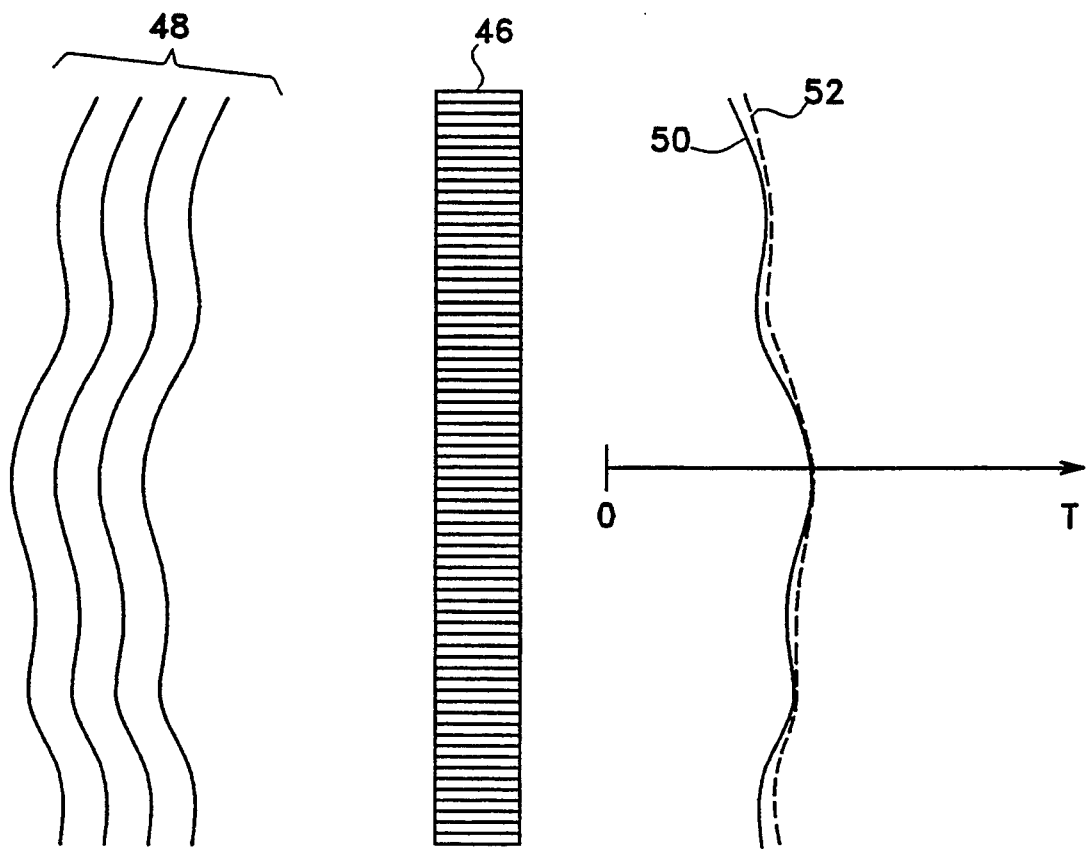
FIG. 3 diagrammatically shows a linear transducer array together with transmitted wave fronts distorted by inhomogeneities in the acoustic refractive index of the acoustic medium.

In FIG. 3, to which reference now is made, a transducer array 46 is shown together with received waves 48 which are distorted as a result of an inhomogeneous media within which the waves are propagated. To correct for the resultant focus defect, time delays must be imposed on the signals from each transducer element, either during transmission or reception or both. The time delay profile across elements of the array which provides for total correction is identified by reference numeral 50 shown in solid line, with delay time being shown along time axis, t.

As noted above, in accordance with this invention, a correction term made up of low order terms of a series expansion, such as a Fourier series, is employed in the focus correction process. Using only several of the lower order terms, a delay profile 52 such as shown in broken line may be obtained to provide good focus correction.

Preferably, a series which minimizes the higher order coefficients for typical object-dependent error regimes is chosen for use with this invention. Two suitable series include the Fourier Series and the Power Series.

$$\text{Fourier Series } \Delta T_n = \sum_m a_m \sin 2\pi mn/N + \sum_m b_m \cos 2\pi mn/N,$$

$-N/2 \leq n \leq N/2$, for an N-element array,
where:
n is the transducer element number,
a and b are constants,
and,
m is an integer.

$$\text{Power Series } \Delta T_n = \sum_m d_m (n - e)^m,$$

$-N/2 \leq n \leq N/2$, for an N-element array
where:
d and e are constants.

Elements of the array refer to operative elements where not all transducer elements are employed every transmission/receiving operation of the ultrasonic imaging system. In the illustrated system of FIG. 1, different groups of transducer elements, selected by switching matrix 22, are employed for scanning of the beam. For sector scanning operation, all transducer elements may be employed, with scanning of the beam being provided by timing of operation of pulsers 16 during transmission, and steering adjustment of delays 28 during reception.

Figure 4:
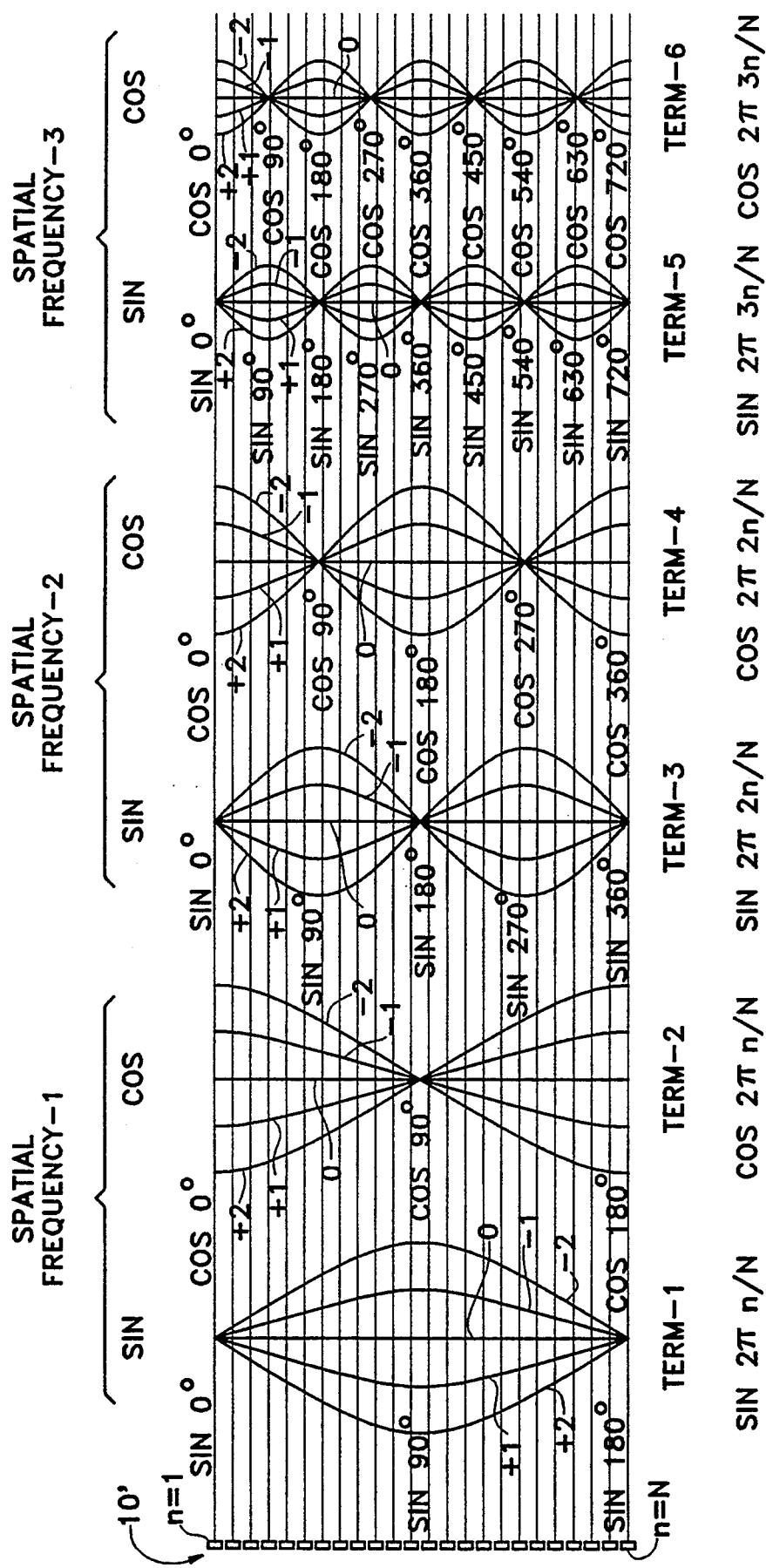
FIG. 4 shows a plurality of delay profiles corresponding to low order spatial frequency terms of a Fourier series.

Delay profile components corresponding to low order spatial frequency terms of a Fourier series are shown in FIG. 4, to which figure reference now is made. There, operative elements 10' of transducer array 10 are shown together with a plurality of different delay profiles corresponding to different low order terms, and different delay profile amplitudes. For simplicity, the profiles are shown as lines rather than a series of points at intersections of horizontal lines extending from individual transducers and said lines. For purposes of illustration, three frequency terms for both the sine and cosine functions thereof, together with zero amplitude and four different non-zero amplitudes, are shown. As will become apparent hereinbelow, delays provided by adjustable signal delay means included in delay array 28 are adjusted by summing those delay profile components, and profile component amplitudes, which provide maximum correction of focus defects.

Figure 5:
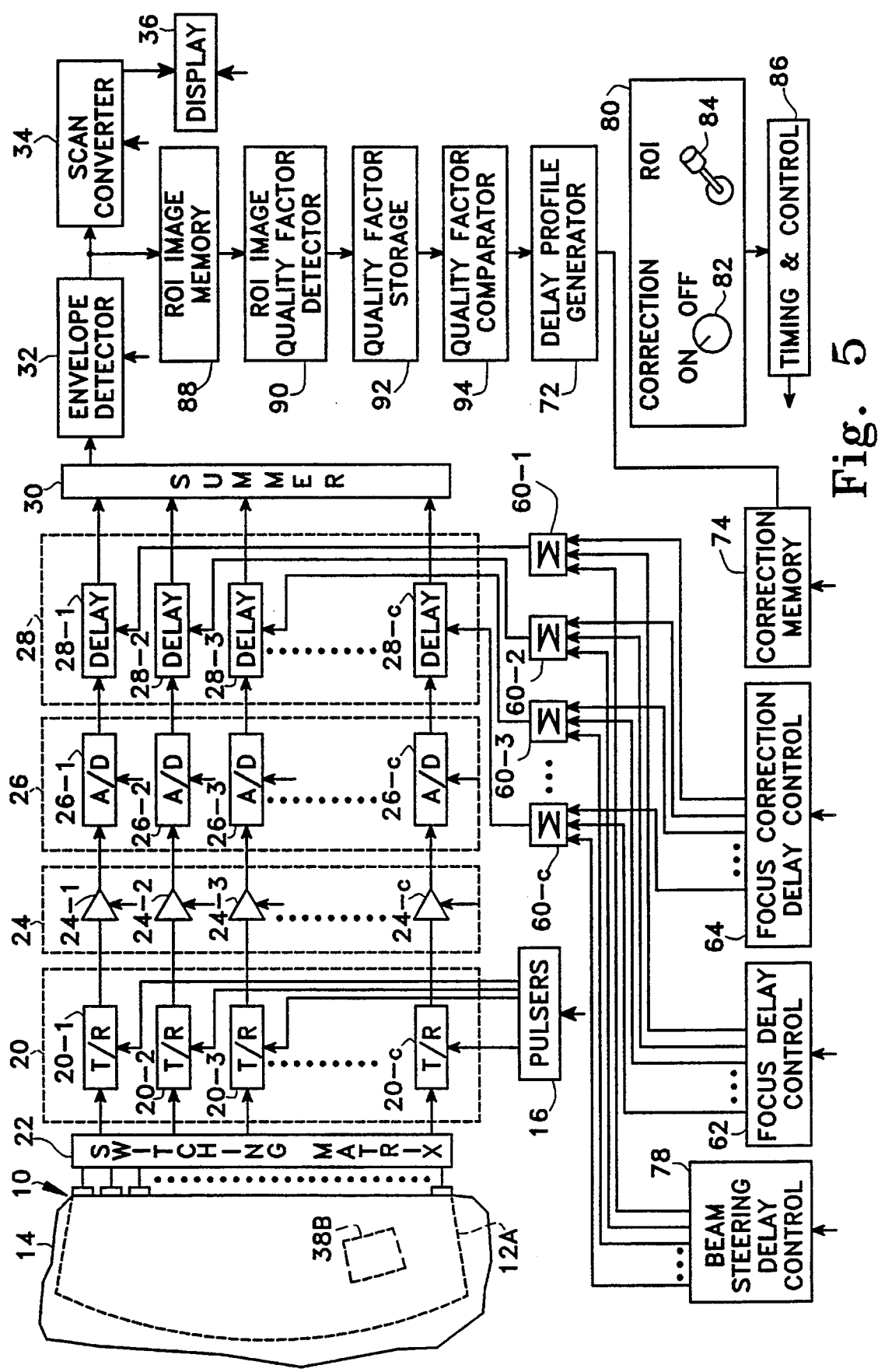
FIG. 5 is a block diagram which is similar to FIG. 1 but showing automatic focusing correction.

Returning to FIG. 1, control signals for controlling delays provided by delay means 28-*l* through 28-*c* are obtained from summing circuits 60-*l* through 60-*c*, respectively. Focusing during the receiving operation is provided by focus delay control means 62 having outputs connected to summing circuits 60-*a* through 60-*c*. Focus correction delay signals also are supplied to summing circuits 60-*l* through 60-*c* from focus-correction delay control means 64 for summing with the focus delay control signals. The summed focus delay and focus correction delay control signals are supplied to delay means 28-*l* through 28-*c* for simultaneous focus and focus correction control during receiving operation. Where beam steering is employed, as shown in FIG. 5, summing circuits 60-*l* through 60-*c* also are supplied with beam steering delay signals for simultaneous steering, focusing, and focus correction control.

For manual focus correction, focus correction switch 44 is turned on, and ROI control 42 is adjusted for selection of a region of interest 38 at display 36. The first low order spatial frequency term to be tested is selected by setting of frequency switch 66 and sin-cos switch 68. In the illustrated switch positions the sine of the first frequency term, the lowest spatial frequency term, is selected which, in FIG. 4, is identified by the $\sin 2\pi n/N$ family of curves. Then, while watching the selected region of interest at the display, the profile amplitude switch 70 is switched to a position which provides the best quality of display within the region of interest as determined by operator observation.

Together, switches 66, 68 and 70 control a delay profile generator 72 having signal outputs corresponding to the selected spatial frequency term, selected by switches 66 and 68, and the selected amplitude thereof, selected by switch 70. Delay profile signals from delay profile generator 72 are momentarily stored in a correction memory 74, the contents of which memory are read out to focus correction delay control unit 64 which, as described above, controls delays 28 for correction focus defects.

When the $\sin 2\pi n/N$ amplitude value which provides for greatest improvement in focusing within the region of interest is determined, store profile switch 76 is momentarily actuated for storage of the selected delay profile component from delay profile generator in computer memory 74. With the first term stored in memory 74, sin-cos switch 68 is moved to the cosine position for selection of the $\cos 2\pi n/N$ term. Delay profile generator 72 now generates one of the $\cos 2\pi n/N$ delay profiles illustrated in FIG. 4. Again, while observing display 36, the amplitude of the delay profile is adjusted by use of profile amplitude switch 70 to a position which provides for best focusing of the display within the selected region of interest. Momentary actuation of store profile switch 76 stores the selected $\cos 2\pi n/N$ profile term in correction memory 74. The previously stored $\sin 2\pi n/N$ profile term stored in memory 74 is combined at focus correction delay control unit 64 with the $\cos 2\pi n/N$ profile term such that both spatial frequency terms contribute to focus correction.

Switch 66 then is switched to the second frequency, and the $\sin 2\pi 2n/N$ and $\cos 2\pi 2n/N$ profile terms are tested in the manner described above for selection of profile amplitudes which result in the most focused display within the region of interest. The process may be repeated for the third and any higher frequency terms of the series expansion to better approximate the best achievable correction. As noted above, the selected spatial frequency terms with selected amplitudes stored in correction memory 74 are combined at focus correction delay control unit 64 for use in establishing a resultant delay correction profile (such as profile 52 shown in FIG. 3) that provides for best focusing within the region of interest. Since signal delays are simultaneously adjusted during the selection of frequency terms, and amplitudes thereof, the process of selecting delay profiles that result in reducing focusing defects requires a relatively small amount of time. The operator is free to change the region of interest as often as desired knowing that an inordinate amount of time will not be required to correct for focusing defects each time the region of interest is changed.

Obviously, the invention is not limited to manual control of focus defect correction. In FIG. 5, to which reference now is made, an ultrasonic imaging system employing automatic, machine-implemented, means for reducing focus defects is shown. The imaging portion of the system, apart from focus correction, may be of substantially the same type shown in FIG. 1 and described above. For purposes of illustration, a system employing sector scanning is shown in FIG. 5, wherein a sector 12A within object 14 to be imaged is shown. Sector scanning is provided by use of beam steering delay control unit 78, outputs from which are supplied to summing circuits 60-*l*-60-*c* along with outputs from focus delay control unit 62 and focus correction delay control unit 64. Sector scanning is a well known technique in the ultrasonic imaging art and requires no detailed description.

The automatic system for reducing focus defects includes a control panel 80 having a correction on-off switch 82 for enabling focus correction operation and a region of interest control 84 for operator selection of the region 38B within the image at which focus correction is to take place. Outputs from these controls are supplied to timing and control unit 86, outputs from which unit provides system timing and control signals.

When focus correction is enabled, the output from envelope detector 32 also is supplied to image memory 88 where an image of the selected region of interest is stored. The ROI image contained in memory 88 is supplied to ROI image quality factor detector 90 where a measure of the quality of the image at the region of interest is obtained. Initially, the delay profile generator 72 outputs no delay profile (equivalent to the $\sin 2\pi x$, zero (0) amplitude, profile illustrated in FIG. 4) whereby the output from quality factor detector 90 is dependent upon the uncorrected image at the region of interest. Means for obtaining a measure of quality of an image are well known and include measuring the "speckle" amplitude, i.e. the mean of the Rayleigh-distributed magnitude, within the region of interest. The use of speckle amplitude, or brightness, as a quality factor is described in publications including the article entitled, "Phase aberration correction in medical ultrasound using speckle brightness as a quality factor," by Nock and Trahey, J. Acoust. Soc. Am. 85(5), May 1989, pp. 1819–1833, the entire contents of which article is incorporated by reference herein. The resultant quality factor is stored at quality factor storage unit 92, the output from which storage unit is supplied to comparator 94.

At quality factor comparator 94, a comparison of the current quality factor with quality factors obtained earlier using different profile amplitudes is made. If no prior quality factors are included at storage 92, no comparison takes place, and the current quality factor remains in storage 92, together with the identity of the profile term and amplitude used to obtain the quality factor. The delay profile generator 72 then is switched to change the amplitude of the selected delay profile term. For example, the profile amplitude may be switched from profile 0 to profile +1 of the $\sin 2\pi n/N$ term shown in FIG. 4. The image within the region of interest resulting from use of the newly selected delay profile amplitude is stored at ROI image storage 88, and the quality thereof is determined at image quality factor detector 90. The resultant current quality factor is stored at storage 92. Now, the current quality factor, using, e.g. the $\sin 2\pi n/N$, amplitude 1 profile as shown in FIG. 4, is compared at comparator 92 with the earlier-obtained quality factor, using, e.g. the $\sin 2\pi n/N$, amplitude 0 profile, and the quality factor that is best, together with the profile amplitude identifying the same, is stored at storage 92.

The process of adjusting delay profile amplitude, calculating the resultant quality factor, and storing the identity of the delay profile amplitude that provides for the best quality image within the region of interest is repeated for a reasonable set of amplitudes of the selected term of the series expansion. When all delay profile amplitudes for the selected series expansion term have been examined, the one providing for the best image is stored in correction memory 74. The above-described process is repeated for each term of the series expansion until the amplitude of the highest useful term has been determined. At the end of the focus correction process, correction memory 74 contains a composite delay profile comprising the sum of all of the low order spatial frequency terms of the series expansion that provide for improved image focusing within the region of interest, which composite delay profile then is used for focus correction.

Figure 6:
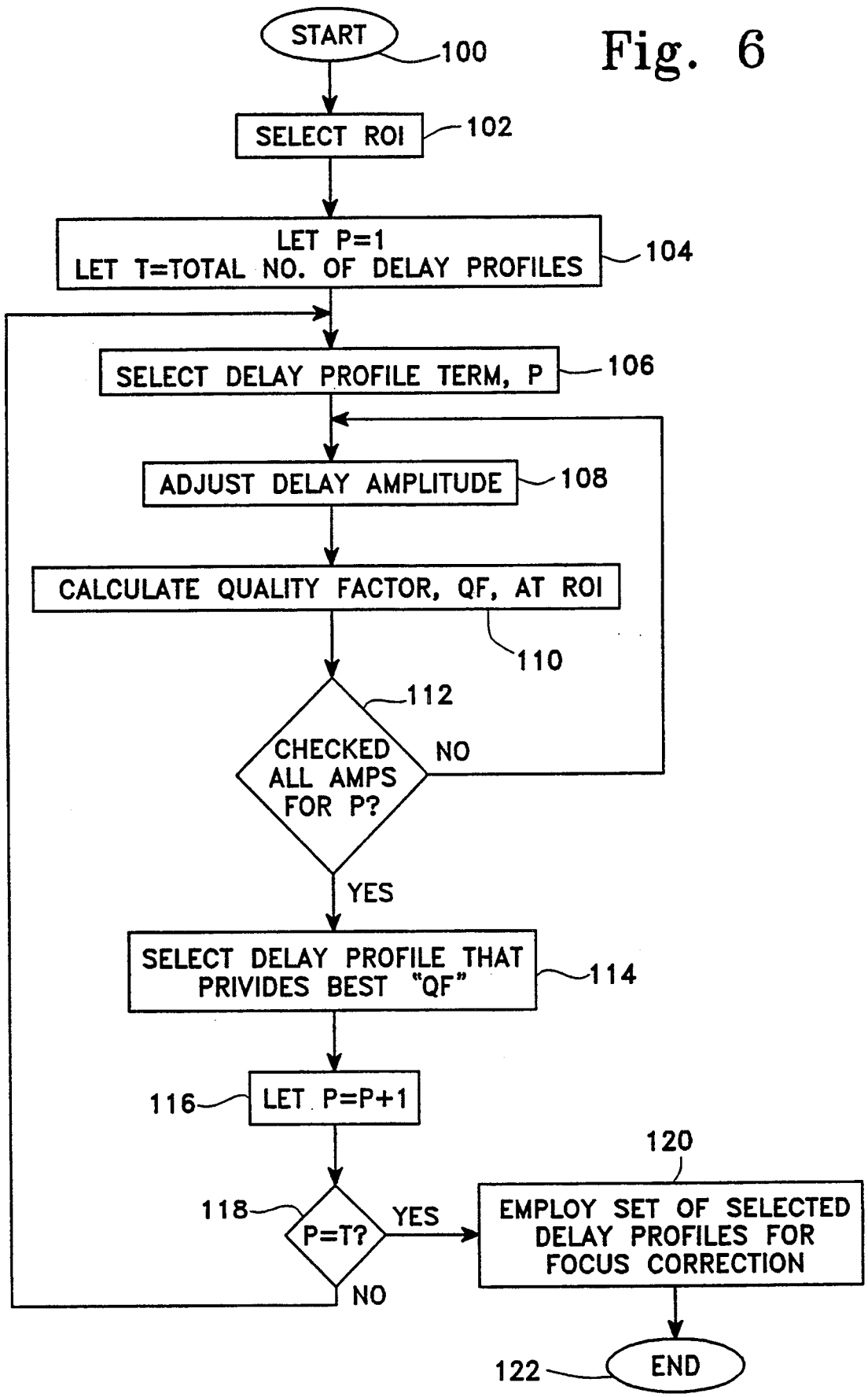
FIG. 6 is a flow diagram for use in explaining operation of the focusing correction system of FIG. 5.

The automatic focus correction scheme illustrated in FIG. 5 and described above may be implemented using a digital computer, the operation of which is included in the flow diagram of FIG. 6, to which figure reference now is made. After start step 100, the region of interest within which focusing correction is desired is selected at step 102 under operator control of ROI control means 84. At step 104, a P counter is set equal to 1, and a T counter is set equal to the total number of delay profile terms included in the series expansion. The delay profile expansion term P is selected at step 106. With the P counter set at 1, the first term, here the $\sin 2\pi n/N$ term, first is selected. At step 108, the amplitude of the delay profile is adjusted, and the quality factor, QF, within the region of interest is calculated at step 110. Next, at decision step 112, it is determined whether all amplitude levels for the selected expansion term, P, have been checked. If the decision is negative, operation returns to step 108 where the delay profile amplitude is changed, after which the quality factor using the new delay profile amplitude is determined at step 110, and operation returns to decision step 112.

When decision step 112 is affirmative, after checking all amplitudes of the selected expansion term, step 114 is entered where the delay profile expansion term amplitude that provides the best quality factor is selected for use. The selected delay profile component is employed during subsequent imaging operation, including operation during which additional delay profile components are being selected. Following selection of the delay profile component at step 114, step 116 is entered where the P counter is incremented by one (1) whereupon decision step 118 is entered for determination of whether the P counter exceeds the total number of terms T of the series expansion employed in the correction process. If not, step 106 is reentered where the next delay profile expansion term, here the $\cos 2\pi n/N$ term, is selected for testing. Operation continues until all expansion terms, and associated expansion term amplitudes, have been checked for those that result in the best quality factor measurement within the selected region of interest. When decision step 118 is affirmative, checking of all expansion terms is completed, and those selected as providing the best quality factor are continued to be employed in the imaging process as indicated at step 120. The process of selecting delay profile component ends at step 122.

Figure 7:
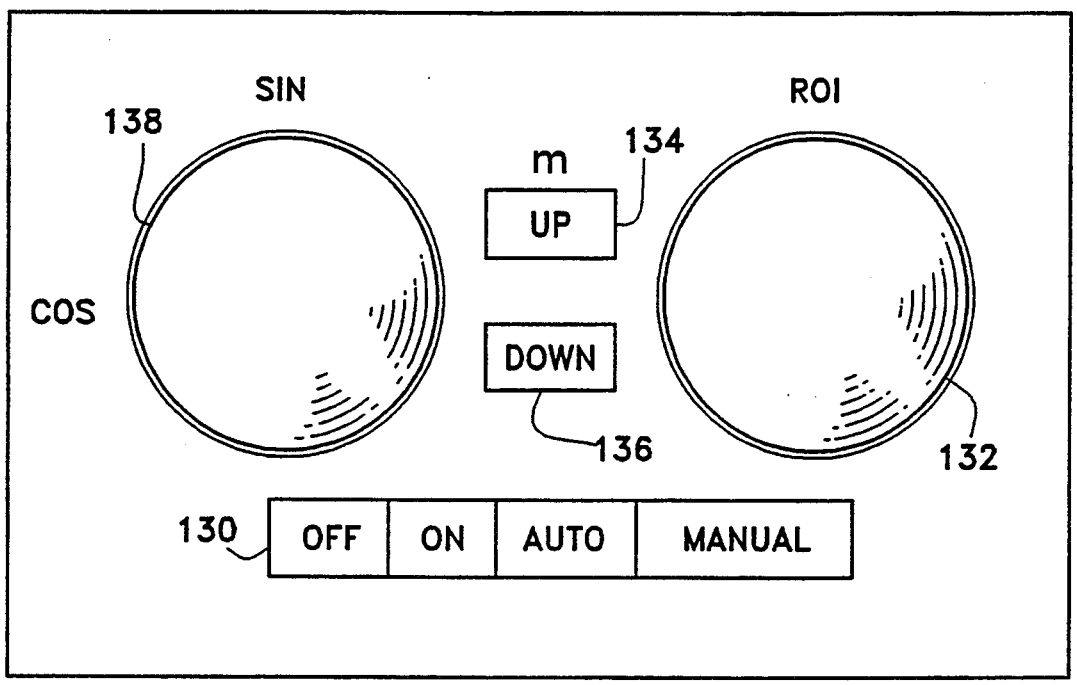
FIG. 7 shows a control panel for use in an ultrasonic imaging system that includes both manual and automatic means for focusing correction.

Reference now is made to FIG. 7 of the drawings wherein a control panel for use in a modified form of this invention is shown. With the illustrated arrangement either manual or automatic focusing correction may be selected under control of off, on, auto and manual switches 130. With either focusing correction operation, a region of interest is selected under control of a first trackball 132. With focusing correction turned on, and the region of interest selected, manual or automatic operation is selected by the operator. Under automatic control, operation proceeds in the manner described above with reference to FIGS. 5 and 6 of the drawings. Under manual operation, the spatial frequency term, here frequency number, m, is selected under operator control of up and down switches 134 and 136, respectively. Profile amplitudes for both the sine and cosine components of the selected spatial frequency term are simultaneously adjustable by use of a second trackball 138, rotation of which in a vertical direction controls the amplitude of the sine component and rotation in a horizontal direction controls the amplitude of the cosine component. Substantially continuous, rather than step, adjustment of the profile amplitudes is provided with this arrangement. As with other embodiments, adjustable signal delay means for operative transducer elements are substantially simultaneously adjusted during operation of trackball 138 so that a minimum of time is required when adjusting for the best quality of image within the selected region of interest. For manual control, operator observation is used to measure the image quality. When the profile amplitudes for the selected spatial frequency term have been adjusted, the selected values are stored when switching to a higher or lower spatial frequency term under control of switches 134 and 136. The number of spatial frequency terms for focusing correction during manual operation is under operator control since the operator may stop selecting new terms for amplitude adjustment whenever desired. The resultant delay profile for focus correction within the region of interest is made up of those delay profile components employed by the operator in the focus correction process.

The invention having been described in detail in accordance with requirements of the Patent Statutes, various other changes and modifications will suggest themselves to those skilled in this art. For example, if, when adjusting the amplitude of a selected expansion term, the quality factor of the region of interest decreases, it may not be required to continue to change the amplitude in the same direction. Also, the number of series expansion terms used in the focus correction is not limited to the six terms illustrated in FIG. 4, and neither are the amplitude selections limited to those illustrated in FIG. 4. If desired, small amplitude steps may be provided for substantially continuous adjustment of amplitude as described above with reference to FIG. 7. Also, as noted above, focus correction may be applied during transmission, rather than reception by control of timing of pulsers 16, or during both transmission and reception. Additionally, the focus correction method of this invention is not limited to use with B-scan operation. For example, it also may be used with C-scan and other imaging processes. Additionally, the novel method may be used with imaging systems which employ two-dimensional transducer arrays in addition to the illustrated linear transducer array. Furthermore, if the entire image is of a sufficiently small area, the region of interest may encompass the entire image. That is, the entire image and region of interest may be coincident. Obviously, analog delay lines may be employed in the analog portion of the imaging apparatus in place of the illustrated digital delays. Also, computational execution of the novel focusing correction method of this invention may be employed using digital computing means in an imaging system employing no discrete delay means. It is intended that the above and other such changes and modifications shall fall within the spirit and scope of this invention as defined in the appended claims.

I claim:

1. In an ultrasonic imaging apparatus for imaging a section within an inhomogeneous object, which apparatus includes a transducer array and transmitter means for energizing elements of the transducer array for beaming ultrasonic energy into the section, said transducer array receiving ultrasonic waves and converting the same to electrical signals, an array of adjustable signal delay means to which electrical signals from operative elements of the transducer array are connected for electronic correction of focus defects produced by acoustic refractive index inhomogeneities within the object, visual display means, means for processing of signals from said signal delay means for visual display of the section at said visual display means, means under operator control for selecting a region of interest within the section, manually operated control means under operator control for controlling the adjustable signal delay means to provide a composite delay profile across operative elements of the transducer array, which composite delay profile comprises at least first and second delay profile components corresponding to predetermined first and second spatial frequency terms, respectively, of a series expansion, time delays provided by the array of adjustable signal delay means being substantially simultaneously adjusted during manual operation of said manually operated control means for amplitude control of said first and second spatial frequency terms, the amplitudes of said first and second spatial frequency terms being adjusted by operator control of said manually operated control means to provide for a composite delay profile which reduces focus defects within the selected region of interest within the section.

2. In an ultrasonic imaging apparatus as defined in claim 1 wherein the series expansion comprises a Fourier series.

3. In an ultrasonic imaging apparatus as defined in claim 2 wherein said first and second delay profile components correspond to sine and cosine spatial frequency terms, respectively, of the Fourier series.

4. In an ultrasonic imaging apparatus as defined in claim 1 wherein the series expansion comprises a power series.

5. In an ultrasonic imaging apparatus as defined in claim 1 wherein said manually operated control means comprises a manually movable means movable in one direction for amplitude control of said first spatial frequency term and movable along a second direction normal to said one direction for amplitude control of said second spatial frequency term.

6. In an ultrasonic imaging apparatus as defined in claim 5 wherein said manually movable means comprises a trackball.

7. In a pulsed ultrasonic imaging method for imaging a section within an inhomogeneous object from reflections from discontinuities within the section of transmitted ultrasonic energy waves, comprising a) receiving by means of a transducer array reflected ultrasonic energy waves and converting the same to electrical signals, b) supplying electrical signals from the transducer array to an array of adjustable signal delay means having delays which are substantially simultaneously adjusted during operation of manually operated control means, c) processing signals from the array of adjustable signal delay means and supplying the processed signals to visual display means for visual display of an image of the section, d) using said manually operated control means manually adjusting the length of delay of the array of adjustable signal delay means so that signals from the delay means are provided with a composite delay profile comprising at least first and second delay profile components that extend across operative elements of the transducer array, said first and second delay profile components corresponding to predetermined first and second spatial frequency terms, respectively, of a series expansion, the amplitude of the first and second spatial frequency terms being adjusted by operator control of said manually operated control means, e) obtaining a measure of quality of the image within a region of interest within the section imaged during step d), f) selecting for use during subsequent imaging amplitudes of said first and second spatial frequency terms which provide the best measure of quality of visual display within the region of interest.

8. In a method as defined in claim 7 wherein said manually operated control means is movable in one direction and in a direction normal to said one direction for amplitude control of said first and second spatial frequency terms, respectively.

9. In a method as defined in claim 8 wherein said manually operated control means comprises a trackball.

10. In a method as defined in claim 7 wherein step e) comprises visually judging the quality of image within the region of interest provided by the visual display.

11. In a method as defined in claim 7 wherein said first and second spatial frequency terms comprise respective sine and cosine terms of a Fourier series.

12. In a method as defined in claim 7 wherein the first and second delay profile components correspond to low order spatial frequency terms of the series expansion.

13. In a method as defined in claim 7 wherein said series expansion comprises a power series.

* * * * *